United States Patent Office 3,451,258
Patented June 24, 1969

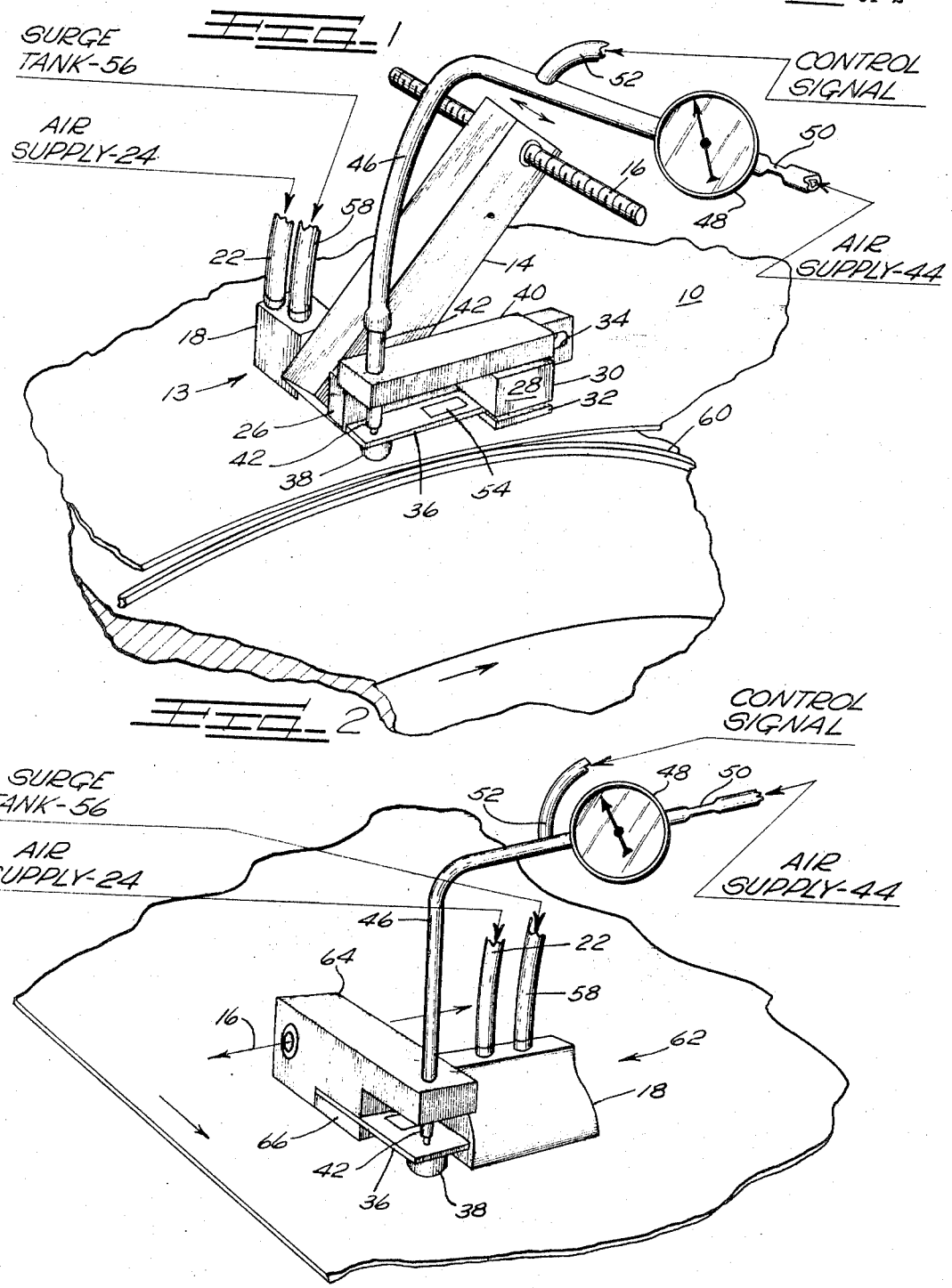

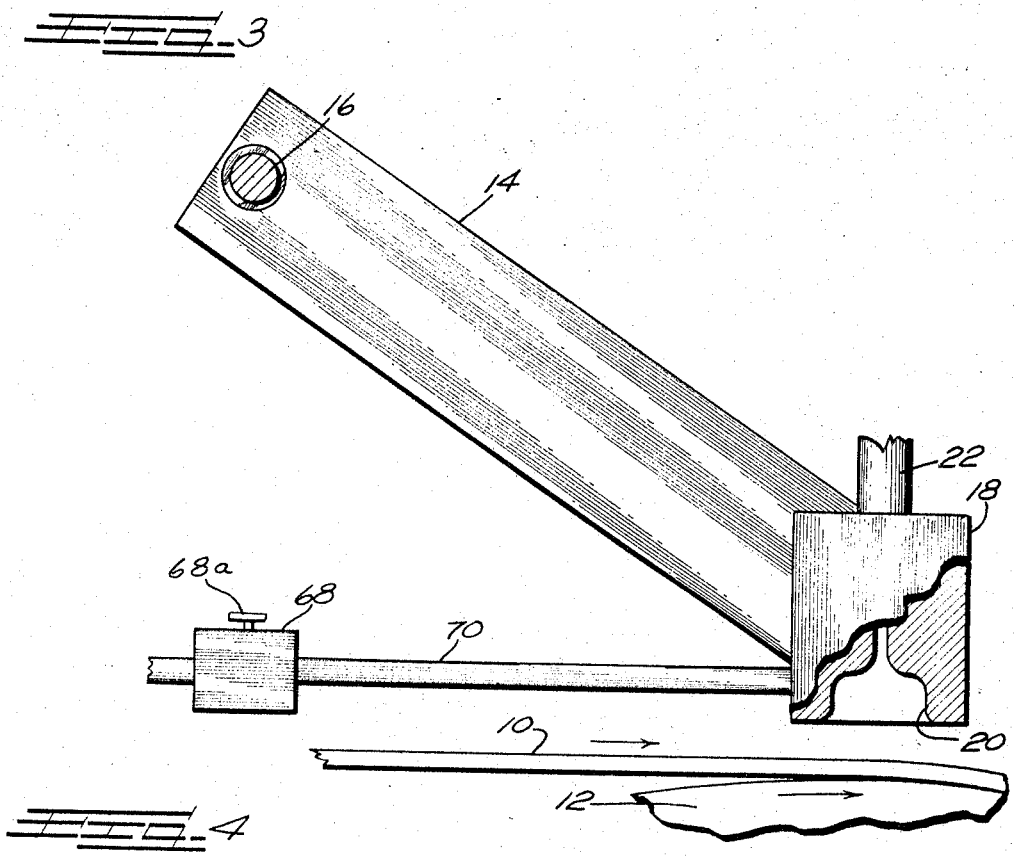
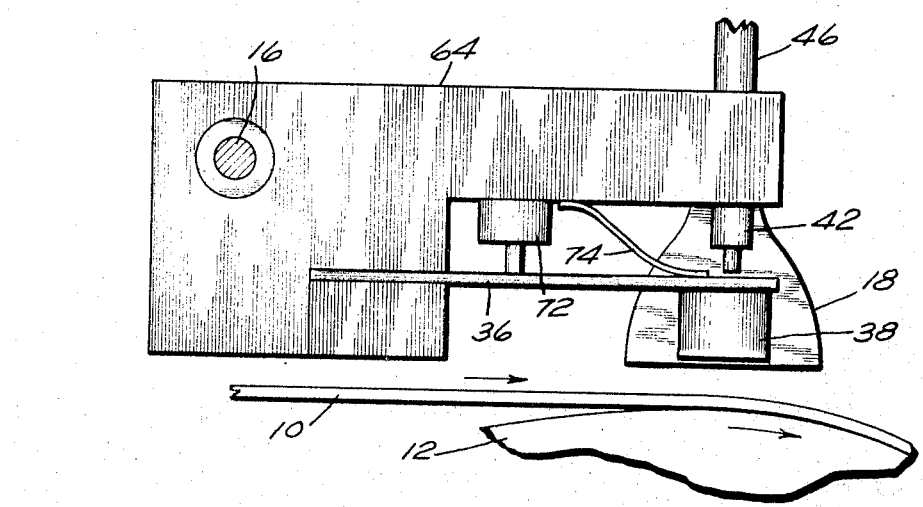

3,451,258
TRAVERSING CROSS MACHINE PROFILE SCANNER
Carl M. Westbrook, Beloit, Wis., assignor to Beloit Corporation, Beloit, Wis., a corporation of Wisconsin
Filed Aug. 29, 1967, Ser. No. 664,162
Int. Cl. G01b *13/04*
U.S. Cl. 73—37.7        12 Claims

ABSTRACT OF THE DISCLOSURE

A profile scanner for use in measuring the thickness of a traveling paper web. The scanner includes a rotatable back-up roll constructed of material having a magnetic attraction for supporting a traveling paper web. A magnetic member is resiliently mounted on a support member and the magnetic member is positioned a fixed distance from the surface of the paper web on the back-up roll so as to provide a fixed flux gap between the back-up roll and the magnetic member. The thickness of the paper web passing between the back-up roll and the magnetic member affects the magnetic field between the magnet and the back-up roll. Variation in web thickness causes corresponding variation in the magnetic field which, in turn, causes fluctuation of the resilient support member. The fluctuation of the resilient support member is used to control the amount of air flow from a nozzle which, in turn, generates control signals within the air passage connected to the nozzle. The control signal generated by variations in thickness of the paper web can be used to control the stock flow onto the forming wire of a paper making machine.

Background of the invention

This invention relates generally to a traversing cross machine profile scanner for paper machines and more particularly to a non-contacting caliper device for measuring the thickness of a traveling paper web.

In the manufacture of paper, particularly in the forming of a continuous paper web, it is essential that the thickness of such web be continually monitored. It is especially necessary to measure the web thickness across the width of the web and generally a laterally traversing measuring device is used in order to ascertain whether the web is of uniform thickness across its width. When a web of paper is being formed, commercially it is many feet wide in width, and monitoring of the thickness is necessary for regulating the pulp stock supply of the paper forming machine at the point at which the thickness is determined, and possibly for regulating other operating factors of the machine. When the thickness of the paper is less or greater than required at a certain lateral location across the width, adjustments must be made in operating factors such as the headbox slice lip to obtain uniform web thickness.

Since a high degree of accuracy is required and necessary in the forming of paper sheets, crude measuring means are not sufficient for monitoring the thickness of a paper web. A variety of prior art structures and systems have been proposed for measuring the thickness of a traveling paper web and supplying an error signal in accordance with such a measurement to control the paper forming mechanism and thereby regulate the thickness of the paper sheet. However, such prior known structures have not been able to attain the high degree of accuracy required in measuring the thickness of the paper web.

One known measuring system includes a member mounted for slidable engagement with the surface of the paper web and means for measuring the deflection of the member. It is obvious that many disadvantages are inherent in the structures of such systems which do not facilitate their use with paper webs. For instance, the member is disposed for catching dirt and voids in the sheet and breaking down the paper web. Furthermore, the accuracy of such structures is not always sufficient nor adequate for present demands on the paper industry, since compression of the paper surface vibration and other factors can destroy accuracy. It can be readily understood that such prior art structures do not provide the necessary accuracy when it is realized that the slidable member is responsive to friction with the paper web and reacts accordingly. This interaction of the slidable member with the paper web causes vibration in the system which considerably reduces the accuracy of any readings attainable therefrom.

Summary of the invention

In an effort to overcome the above objections and drawbacks, structures were proposed for damping the vibrations of the slidable member. However, although such structures have provided a more consistent measurement of the paper web thickness, their responsiveness to changes in thickness was decreased proportionally. Therefore, a time delay resulted in the control of the paper supply and adjustments for varying the paper thickness cannot be readily attained.

It is, therefore, an object of this invention to provide a traversing cross machine profile scanner which does not contact the paper web which is being monitored.

It is another object of the present invention to provide a cross machine profile scanner which attains extremely accurate readings of the thickness of a traveling paper web.

Still another object of the present invention is to provide a profile scanner which is unaffected by dirt and voids in the paper web which is being monitored.

Yet another object of the present invention is to provide a profile scanner for continuously measuring the thickness of a traveling paper web which employs highly responsive measuring means which have negligible time lag.

Yet another object of the present invention is to provide a profile scanner for measuring the thickness of a traveling paper web which is not subject to fluctuations and variations from external sources.

These and other objects will be more fully realized from the novel structure of the present invention which generally includes a back-up member of material having magnetic attraction for supporting a traveling paper web, a support member, means for maintaining the support member a fixed distance from one surface of the paper web, a magnet mounted on the support member and movable with respect thereto in response to the displacement of the support member from the magnetic member, and means for measuring the displacement of the magnet with respect to the support member.

Brief description of the drawings

The invention, however, and other objects, features and advantages thereof will be more fully realized and understood from the following detailed description when taken in conjunction with the accompanying drawings, wherein:

FIGURE 1 is a perspective view of one embodiment of the profile scanner;

FIGURE 2 is a perspective view of another embodiment of the traversing cross machine profile scanner;

FIGURE 3 is a side elevational view of an alternate form of the scanning member of the device illustrated in FIGURE 1; and FIGURE 4 is a side elevational view of an alternate form of the scanning member of the device illustrated in FIGURE 2.

Like reference numerals throughout the various views of the drawings are intended to designate the same or similar structure.

*Description of the preferred embodiments*

With reference to the drawings, and in particular to FIGURE 1, there is shown one preferred embodiment of the present invention. A paper web, generally designated with the reference numeral 10, is supported on back-up means such as a rotatable back-up roll 12 of a magnetically attractable material for traveling relationship therewith.

A scanning device, generally designated with the reference numeral 13, including a support member 14, is mounted over one surface of the paper web 10 on a traversing mechanism 16. The support member 14 is disposed for traveling transversely to the direction of the paper web movement on the traversing mechanism 16 and is disposed for changing its direction of movement upon reaching each edge of the paper web 10.

The traversing mechanism 16 is illustrated diagrammatically in the drawings, since various mechanisms may be employed as desired for moving the support member 14 in its desired traversing movement across the paper web and across the back-up roll. For instance, the traversing mechanism 16 may represent a threaded rod and the support member 14 may include corresponding screw threads for mating engagement with one another. It can be readily appreciated that reversing screw threads could be employed which would cause the support member 14 to traverse the machine in one direction until reaching an end thereof, and without changing the rotation of the traversing mechanism, the support member would be driven in the opposite direction. Also, it will be appreciated that the traversing mechanism may represent a single threaded rod and means may be employed for changing the rotational direction of the rod to cause the support member to move in the desired one of two directions. Therefore, as the support member approaches one edge of the paper web, the rotation changing mechanism would reverse the rotational direction of the screw threaded rod. Furthermore, the support member 14 may be mounted for tranverse movement to the traveling direction of the paper web on a chain or similar article. The traversing mechanism 16 may also represent a collapsible tube for moving the support member in the desired direction transverse to the traveling direction of the paper web. It is to be understood, therefore, that any suitable structure for moving the support member in its desired traversing movement may be employed.

An air shoe 18 is secured to the unsupported end of the support member 14 and includes an air pocket 20 (FIGURE 3) in a side thereof which is disposed adjacent to the traveling paper web. Connected through a hose 22 to the air shoe 18 and in fluid communication with the air pocket and the traveling paper web is a supply of regulated air 24.

A member 26 is secured at the unsupported end of the support member 14 and extends substantially horizontally therefrom. A clamping assembly 28 including a block 30 and a plate 32 are mounted on the member 26. The member 26 includes a slot 34 therein for allowing adjustment of the clamp assembly 28 with respect to the support member 14. A resilient member 36 is clamped between the block 30 and the plate 32 of the clamping assembly 28 and forms a resilient cantilever. A magnet 38 is secured to a free end of the resilient member 36 and is disposed in spaced relationship to the web 10.

A beam 40 is mounted on the block 30 and extends therefrom over the entire length of the resilient member 36. A nozzle member 42 extends through the beam 40 and is connected to an air supply 44 through a hose 46. A gauge 48 is disposed in the hose 46 for measuring the air pressure therein.

In the embodiment illustrated in FIGURE 1, when air is supplied to the air shoe 18 through the hose 22, the member 14 is supported a fixed distance from the surface of the paper web 10 on an air cushion therebetween. The air supply 24 is maintained at a constant level causing the air shoe 18 to remain or position itself a fixed distance from the top surface of the paper web 10, regardless of any changes in the paper thickness. Therefore, if the thickness of the paper web changes, the distance between the air shoe 18 and the magnetic back-up roll 12 changes accordingly.

Magnet 38 being supported on the free end of the resilient cantilever 36 is attracted toward the magnetic back-up roll 12 in accordance with the distance therebetween. Therefore, forced pressure in the shoe 18 maintains a fixed distance between the shoe and the paper web, and if the web caliper varies, the distance between the magnet and the back-up roll 12 will vary and the magnetic attraction will vary accordingly. As this gap narrows, the force of attraction of the magnet to the roll increases as the square of the decrease in the gap. Since the magnet 38 is mounted on a resilient cantilever 36, the cantilever will distort with the changes in the force of attraction between the magnet and the roll 12. Distortion of the cantilever 36, therefore, can be used to obtain readings indicative of the paper web thickness. It is to be understood, of course, that a minimum thickness of paper would not allow the pole face of the magnet to make contact with the sheet or film being measured.

The cantilever deflection can be measured by any of the well known measuring systems available in the art. For instance, the deflection of the cantilever can be accurately determined by capacitance measuring systems, a differential transformer measuring system, or with the well known optical methods available. For purposes of exemplification, however, one preferred measuring system and one alternate form thereof is illustrated.

The preferred system for measuring the deflection of the cantilever beam is a nozzle flapper senser including the nozzle 42 with the cantilever beam 36 disposed in air restricting relationship therewith. The regulated air supply 44 supplies a continuous and constant pressure of air at a restriction or orifice 50 in the hose 46. When the cantilever 36 moves with respect to the nozzle 42, differences in air pressure will be realized by the gauge 48. An air control signal will, therefore, be realized through a hose 52 extending from the air hose 46. This control signal can, therefore, be employed to control the material being supplied for forming the paper sheet.

Therefore, as the cantilever beam 36 is deflected toward the magnetic back-up roll 12 and away from the end of the nozzle 42, the control signal derived through hose 52 will increase indicating a reduction in the thickness of the paper web. The cantilever 36 acting to restrict the passage of air to the end of the nozzle 42 will produce a corresponding signal to the hose 52 when the thickness of the paper web 10 increases beyond the desired dimension and causes the magnet 38 to move away from the magnetic back-up roll 12.

The deflection of the cantilever beam 36 may also be measured with a strain gauge 54 secured to one bending surface of the cantilever. The strain gauge 54 may be connected through a suitable amplifier to a control device for controlling the paper supply. Therefore, as the cantilever beam 36 is deflected, a change in the resistance value of the strain gauge will provide an appropriate signal to operate control mechanism for the papermaking machine.

Occasionally a chatter or oscillation may occur in the support for the scanner due to the forced air from the air supply 24 interacting between the air shoe 18 and the paper web 10. This slight interaction can be eliminated by connecting a surge tank 56 through a hose 58 to the air pocket 20 within the shoe 18. Since this interaction is dependent somewhat on the compressibility of the air, the first tank 56 absorbs the excessive pressures which might result instantaneously.

A uniform film of non-ferrous material 60 may be applied at either edge of the back-up roll 12 to allow a calibration check at the beginning of a run or each time the scanner has traversed the paper web 10. The film 60 will preferably have the same thickness as the desired paper web thickness and will be spaced from the edge of the web so as not to interfere. Furthermore, such a film can be employed to eliminate thermal drift of the device and other extraneous effects thereon.

Since the magnetic back-up roll 12 may be any suitable roll within the paper machine, the reading of permeability may not be the same in all sections in a plane along the axis of the roll. If such a condition exists, the scanner can be traversed across the back-up roll 12 without a sheet of paper thereon and a record of the permeability differential across the roll face can be recorded and made available. This recorded error could be corrected if automatic control was desired, or a non-linear chart could be employed if readout and manual control was desired. Furthermore, one of the available transferring rolls of the paper machine need not be employed, and the roll 12 illustrated in the drawings may represent a narrow face ferrous wheel which can be made to traverse the paper web directly under the scanner. In such a case, however, the film of non-ferrous material 60 could not be employed. It can be readily understood that bending of the back-up roll 12 will not produce any error in the thickness readout from the scanner device.

The embodiment illustrated in FIGURE 2 is a simplified scanner device as compared to that illustrated in FIGURE 1. The scanner device illustrated in FIGURE 2 may be preferred for its simplification over that illustrated in FIGURE 1 if vibrations are not a major problem. As shown, the scanner generally designated with the reference numeral 62 includes a substantially horizontally disposed support member 64 having a clamping plate 66 attached thereto. The resilient cantilever 36 is supported between the clamping plate 66 and the support member 64 and performs with the magnet 38 and nozzle 42 in the same manner as the device illustrated in FIGURE 1. The air shoe 18 is directly connected to the support member 64 and includes an air pocket therein in fluid communication with the air supply 24 and the surge tank 56. An identical arrangement of control and measuring is employed in the embodiment of FIGURE 2.

FIGURE 3 illustrates an alternate form of the scanning device illustrated in FIGURE 1 for removing any chatter that might exist between the air pocket 20 and the paper web 10. As shown, a mass in the form of a block 68 extends from the air shoe 18 on an arm 70. It will be observed that the block 68 is disposed in substantially vertical alignment with the traversing mechanism 16. The mass may be adjustable however on its supporting rod 70 for varying the damping effect, being held in place by a set screw 68a. With the mass arrangement illustrated in FIGURE 3, the surge tank 56 may be eliminated. The angle of the support arm 14 with the plane of the web (which is normal to the path of air emitted from the shoe 18) is preferably 45°, although other angles may be used.

The mass arrangement illustrated serves to lower the frequency of the scanning system and dampens any instantaneous changes in air pressure within the cavity 20. The mass arrangement shown also serves to balance the scanning device and thereby eliminates the need for parallel beam support thereof.

An alternate form of the scanner device of FIGURE 2 is illustrated in FIGURE 4, wherein a dash pot 72 is included between the support member 64 and the resilient cantilever 36 for removing any vibrations that might exist due to the natural frequency of the cantilever beam 36.

If desired, and as shown, an S-shaped leaf spring 74 may be employed between the support member 64 and the cantilever beam 36 for removing any vibrations therebetween. It is to be understood, of course, that either the dash pot 72 or the leaf spring 74 may not be necessary since the scanning device is supported on a cushion of air existing between its free end and the paper web 10. This cushion of air eliminates all vibrations which exist because of any interaction between the scanning device and the paper web 10. That is, since engagement between the scanning device and the paper web 10 is completely eliminated, vibrations will be substantially eliminated.

The principles of the invention explained in connection with the specific exemplifications thereon will suggest many other applications and modifications of the same. It is accordingly desired that, in construing the breadth of the invention, it shall not be limited to the specific details shown and described in connection with the exemplifications thereof.

I claim as my invention:

1. A profile scanner for measuring the thickness of a traveling paper web comprising:
   (a) back-up means of magnetically-attractable material for supporting said paper web in substantially horizontal traveling relationship,
   (b) support means including a resilient member disposed above said traveling paper web,
   (c) a magnet mounted on said resilient member for deflecting toward and away from said back-up means in accordance with the distance therebetween,
   (d) means for moving said support means across the paper web, said support means being pivotally connected to said moving means for arcuate movement above the traveling web in a plane perpendicular to the direction of its movement by said moving means,
   (e) means mounted on said support means out of contact with said traveling web for holding said support means a fixed distance from said web, and
   (f) means carried by said support means for measuring the thickness of the web as a function of the changes in distance between said magnet and said back-up means.

2. The profile scanner of claim 1, wherein said support means comprises a support member pivotally connected to said moving means and said holding means comprises a regulated air supply and means having an air pocket extending toward said traveling web and connected in fluid communication with said air supply for creating a lifting force to position said support member above said web and on one side of its pivot point as referenced from a vertical line through the pivot point, and wherein said support means further comprises a counter-weight extending horizontally from said support member toward the other side of the pivot point, as referenced from said vertical line, to balance said support member.

3. A profile scanner according to claim 1 wherein said member of magnetically attractable material is a rotatable back-up roll for supporting a traveling paper web.

4. The profile scanner of claim 3 including a film of non-magnetic material having a thickness equal to the desired thickness of the paper web secured to said rotatable back-up roll for calibrating said magnet at a fixed distance from the non-magnetic material.

5. The profile scanner of claim 1 wherein said resilient member is fixed at one end thereof to form a cantilever and said measuring means includes a nozzle mounted on said support means and having the open end thereof extended toward the free end of said resilient cantilever and in the deflection path thereof, said nozzle connected to said regulated supply of air, and means for measuring air pressure between said regulated supply of air and said nozzle.

6. The profile scanner of claim 1 wherein said resilient member is fixed at one end thereof to form a cantilever, and said measuring means includes a strain gauge secured to said, cantilevered member and means for measuring the change in resistance value of said strain gauge.

7. A profile scanner according to claim 1 wherein said holding means includes means having an air pocket in one side thereof extending toward the member of magnetically-attractable material and further including a regulated air supply connected to the last-mentioned means and in fluid communication with said air pocket.

8. A profile scanner according to claim 7 wherein said means for measuring the thickness of the web includes a nozzle mounted on said support means and in fluid communication with said regulated air supply, said nozzle positioned adjacent said resilient member carrying said magnet for impeding the passage of air from said nozzle.

9. The profile scanner of claim 7, comprising a surge tank connected in fluid communication with said air pocket.

10. A profile scanner for measuring the thickness of a travelling paper web comprising
(a) a rotatable back-up roll of magnetic material for supporting the paper web in substantially horizontal travelling relationship,
(b) a support member mounted for transverse movement to the travelling direction of the paper web and having an air pocket therein,
(c) a regulated air supply connected to said support member and in fluid communication with said air pocket and with the paper web,
(d) a resilient cantilever mounted at a fixed end thereof to said support member,
(e) a magnet mounted on the free end of said resilient cantilever,
(f) a counter-weight extending substantially horizontally from said support member, and
(g) means for measuring the deflection of the free end of said cantilever.

11. A profile scanner according to claim 10 further including a surge tank connected to said support member and in fluid communication with said air pocket.

12. A profile scanner according to claim 10 wherein said support member includes a shoe connected thereto, said air pocket being formed in said shoe.

References Cited
UNITED STATES PATENTS

| 2,920,298 | 1/1960 | Hines | 73—88.5 |
| 3,164,981 | 1/1965 | Knobel | 73—37.5 |
| 3,194,055 | 7/1965 | Knobel | 73—37.5 |

LOUIS R. PRINCE, *Primary Examiner.*

WILLIAM A. HENRY II, *Assistant Examiner.*